US012808750B2

(12) United States Patent
So et al.

(10) Patent No.: US 12,808,750 B2
(45) Date of Patent: Nov. 24, 2026

(54) DATA CORRECTION APPARATUS, OPTICAL TIME-DOMAIN REFLECTOMETER, OPTICAL FIBER MEASUREMENT SYSTEM, DATA CORRECTION METHOD AND NON-TRANSITORY COMPUTER READABLE MEDIUM

(71) Applicants: Yokogawa Electric Corporation, Musashino (JP); Yokogawa Test & Measurement Corporation, Hachioji (JP)

(72) Inventors: Yoshihisa So, Hachioji (JP); Taro Kakehashi, Hachioji (JP); Daisuke Sato, Hachioji (JP)

(73) Assignees: Yokogawa Electric Corporation, Musashino (JP); Yokogawa Test & Measurement Corporation, Hachioji (JP)

( * ) Notice: Subject to any disclaimer, the term of this patent is extended or adjusted under 35 U.S.C. 154(b) by 94 days.

(21) Appl. No.: 18/738,310

(22) Filed: Jun. 10, 2024

(65) Prior Publication Data

US 2025/0027838 A1 Jan. 23, 2025

(30) Foreign Application Priority Data

Jul. 21, 2023 (JP) ................................ 2023-119431

(51) Int. Cl.
*G01M 11/00* (2006.01)
*G01M 11/02* (2006.01)

(52) U.S. Cl.
CPC .... *G01M 11/3145* (2013.01); *G01M 11/0207* (2013.01)

(58) Field of Classification Search
CPC ......... G01M 11/3145; G01M 11/0207; G01M 11/30
See application file for complete search history.

(56) References Cited

U.S. PATENT DOCUMENTS 11,290,179 B1 * 3/2022 Poulin .................. H04B 10/071
2008/0085114 A1 * 4/2008 Nakajima .......... H04B 10/0775 398/33

(Continued)

FOREIGN PATENT DOCUMENTS

JP 2006-101021 A 4/2006
JP 2013-083738 A 5/2013

(Continued)

OTHER PUBLICATIONS

JP2013083738A_translation_with_paragraph numbers (Year: 2013).*

(Continued)

*Primary Examiner* — Tarifur R Chowdhury
*Assistant Examiner* — Carlos Perez-Guzman
(74) *Attorney, Agent, or Firm* — WHDA, LLP

(57) ABSTRACT

A data correction apparatus includes an acquisition unit configured to acquire measurement data from an optical time-domain reflectometer that measures one or more events existing in an optical fiber under test, a display configured to display one or more known events and one or more detection events so that a user can check a difference between the known events and the detection events, an input interface configured to accept, from the user, operation input to modify the detection events, and a correction unit configured to modify the detection events based on the operation input accepted from the user.

16 Claims, 12 Drawing Sheets

(56) References Cited

U.S. PATENT DOCUMENTS

2012/0200846 A1* 8/2012 Levin ................ G01M 11/3145
356/73.1
2022/0123832 A1* 4/2022 Takasu .............. G01M 11/3145

FOREIGN PATENT DOCUMENTS

JP 2016-53542 A 4/2016
JP 2022-073128 A 5/2022

OTHER PUBLICATIONS

Office Action dated Feb. 3, 2026, issued in counterpart JP Application No. 2023-119431, with English translation. (8 pages).
Office Action dated May 19, 2026, issued in counterpart JP Application No. 2023-119431, with English translation. (8 pages).

* cited by examiner

| EVENT NO. | EVENT TYPE | DISTANCE (km) | SPLICE LOSS (dB) | RETURN LOSS (dB) | CUMULATIVE LOSS (dB) | dB/km | GROUP REFRACTIVE INDEX | COMMENT |
|---|---|---|---|---|---|---|---|---|
| 1 | | 1.99321 | 0.242 | - | 0.776 | 0.389 | 1.48000 | |
| 2 | | 2.99286 | 0.257 | 49.940 | 1.275 | 0.257 | 1.48000 | |
| 3 | | 3.98846 | 0.125 | - | 1.706 | 0.175 | 1.48000 | |
| 4 | | 4.98506 | 0.411 | - | 2.020 | 0.189 | 1.48000 | |
| 5 | | 5.98370 | -0.136 | - | 2.620 | 0.190 | 1.48000 | |
| END | | 6.97524 | - | 15.430 | 2.670 | 0.188 | 1.48000 | |

FIG. 9

| EVENT LIST (MASTER) | |
|---|---|
| No. | DISTANCE (km) |
| 1 | 2.00000 |
| 2 | 4.00000 |
| 3 | 4.20000 |
| 4 | 5.00000 |
| 5 | 7.00000 |
| E | 32.00000 |

FIG. 11

| No. | DISTANCE (km) | SECTION REFRACTIVE INDEX |
|---|---|---|
| 1 | 2.00139 | 1.48000 |
| 2 | 3.98650 | 1.48000 |
| 3 | 4.19087 | 1.48000 |
| 4 | 6.97002 | 1.48000 |
| 5 | 16.35272 | 1.48000 |
| E | 31.83664 | 1.48000 |

150

DATA CORRECTION APPARATUS, OPTICAL TIME-DOMAIN REFLECTOMETER, OPTICAL FIBER MEASUREMENT SYSTEM, DATA CORRECTION METHOD AND NON-TRANSITORY COMPUTER READABLE MEDIUM

CROSS-REFERENCE TO RELATED APPLICATION

This application claims priority to Japanese Patent Application No. 2023-119431, filed on Jul. 21, 2023, the entire contents of which are incorporated herein by reference.

TECHNICAL FIELD

The present disclosure relates to a data correction apparatus, a data correction method and a non-transitory computer readable medium for correcting measurement data on an optical fiber measured by an optical time-domain reflectometer (OTDR), and an optical time-domain reflectometer and an optical fiber measurement system for measuring an optical fiber.

BACKGROUND

As described in Patent Literature (PTL) 1, in optical time-domain reflectometers that detect events related to optical fibers, it is known to examine the validity of the detected events.

CITATION LIST

Patent Literature

PTL 1: JP 2016-53542 A

SUMMARY

A data correction apparatus according to some embodiments includes:

- an acquisition unit configured to acquire measurement data from an optical time-domain reflectometer that measures one or more events existing in an optical fiber under test;
- a display configured to display one or more known events whose existence in the optical fiber under test has been known in advance and one or more detection events detected from the measurement data, so that a user can check a difference between the known events and the detection events;
- an input interface configured to accept, from the user, operation input to modify the detection events; and
- a correction unit configured to modify the detection events based on the operation input accepted from the user.

An optical fiber measurement system according to some embodiments includes:

- the data correction apparatus described above; and
- an optical time-domain reflectometer configured to output measurement data to the data correction apparatus.

A data correction method according to some embodiments includes:

- acquiring measurement data from an optical time-domain reflectometer that measures one or more events existing in an optical fiber under test;

- displaying one or more known events whose existence in the optical fiber under test has been known in advance and one or more detection events detected from the measurement data, so that a user can check a difference between the known events and the detection events;
- accepting, from the user, operation input to modify the detection events; and
- modifying the detection events based on the operation input accepted from the user.

A non-transitory computer readable medium according to some embodiments stores a data correction program. The data correction program is configured to cause a processor to execute operations that include:

- acquiring measurement data from an optical time-domain reflectometer that measures one or more events existing in an optical fiber under test;
- displaying one or more known events whose existence in the optical fiber under test has been known in advance and one or more detection events detected from the measurement data, so that a user can check a difference between the known events and the detection events;
- accepting, from the user, operation input to modify the detection events; and
- modifying the detection events based on the operation input accepted from the user.

BRIEF DESCRIPTION OF THE DRAWINGS

In the accompanying drawings:

FIG. 9 illustrates an example of a screen to input events of the optical fiber under test in a table format;

FIG. 11 is a table illustrating an example of automatic detection results of events of the optical fiber under test.

DETAILED DESCRIPTION

Figure 1:
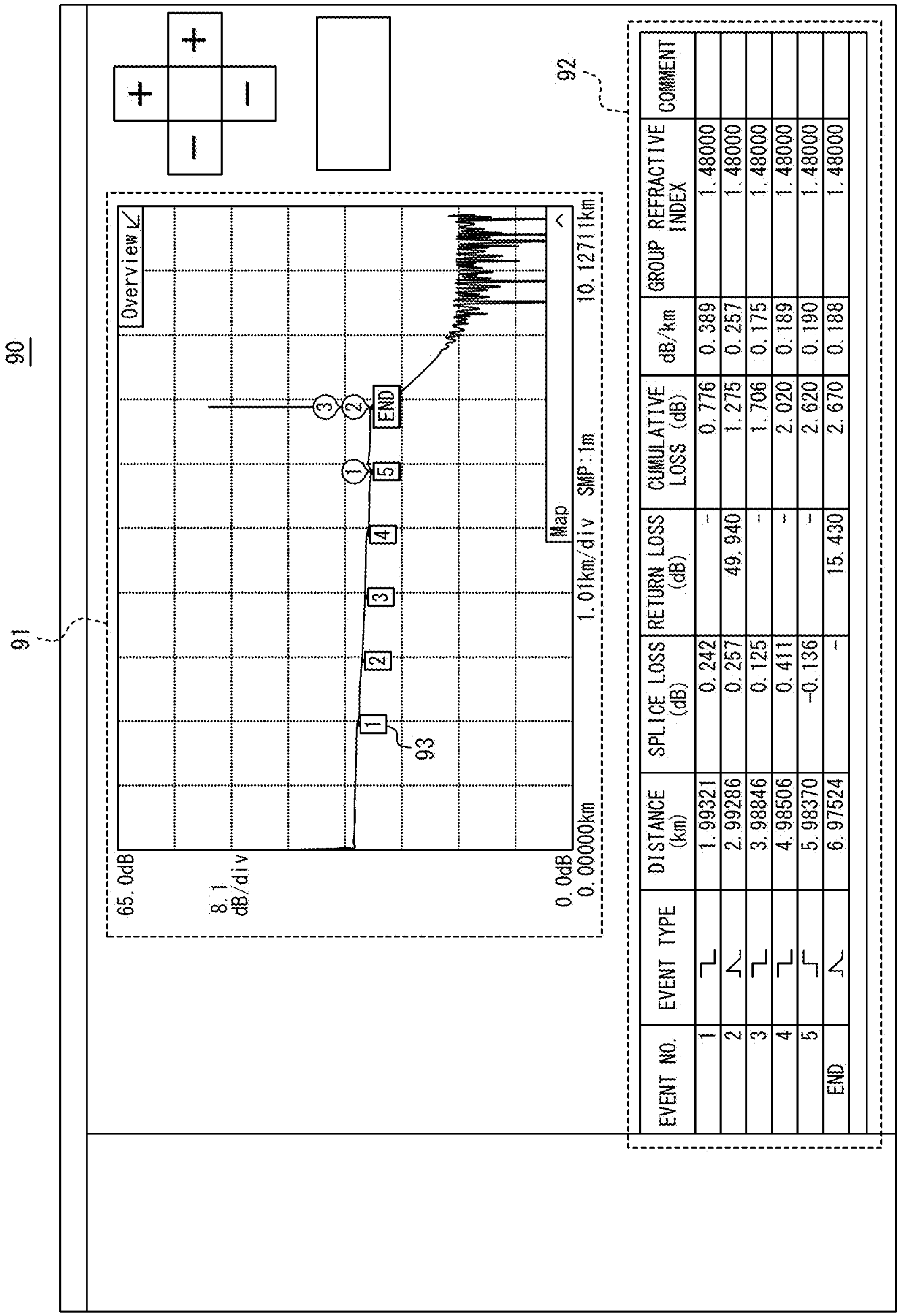
FIG. 1 is a display screen for measurement data from an optical time-domain reflectometer according to a comparative example.

Measurement data on events, such as splicing or fusion points, of an optical fiber may differ from information on actual events. When a user knows the information on the actual events in advance, the measurement data on the events is manually modified. When the number of the events of the optical fiber is large, a modification operation for the measurement data becomes complicated. There is a need to improve the convenience of the modification operation for the measurement data. The present disclosure provides a data correction apparatus, an optical time-domain reflectometer, an optical fiber measurement system, a data correction method and a non-transitory computer readable medium that can improve the convenience of the modification operation for the measurement data on the events of the optical fiber.

(1) A data correction apparatus according to some embodiments includes:

- an acquisition unit configured to acquire measurement data from an optical time-domain reflectometer that measures one or more events existing in an optical fiber under test;
- a display configured to display one or more known events whose existence in the optical fiber under test has been known in advance and one or more detection events detected from the measurement data, so that a user can check a difference between the known events and the detection events;
- an input interface configured to accept, from the user, operation input to modify the detection events; and
- a correction unit configured to modify the detection events based on the operation input accepted from the user.

Displaying the difference between the known events and the detection events allows the user to check only a modification target event. The user can check only the modification target event, and thus can easily or efficiently perform the modification operation for the detection events detected from the measurement data. As a result, the user's convenience is improved.

(2) In the data correction apparatus according to one embodiment, described in (1) above, the display may be configured to:

- display, as the difference, an event, out of the detection events, that is not included in the known events, and
- display, as the difference, an event, out of the known events, that is not included in the detection events. This allows the user to recognize the modification target event more easily. As a result, the user's convenience is improved.

(3) In the data correction apparatus according to one embodiment, described in (2) above,

- the display may include an input data display configured to display the known events, and a measurement data display configured to display the detection events,
- the input data display may be configured to display an event that is not included in the detection events but is included only in the known events, in correspondence with blank space in the measurement data display, and
- the measurement data display may be configured to display an event that is not included in the known events but is included only in the detection events, in correspondence with blank space in the input data display. This allows the user to recognize the modification target event more easily. As a result, the user's convenience is improved.

(4) In the data correction apparatus according to one embodiment, described in (3) above, the input data display and the measurement data display may not display an event that is included in common in the known events and the detection events. This allows the user to recognize the modification target event, which is an event that is not included in common in the known events and the detection events, more easily. As a result, the user's convenience is improved.

(5) In the data correction apparatus according to one embodiment, described in any one of (1) to (4) above,

- the display may include a waveform display configured to display a waveform of the measurement data, and
- when a portion of the waveform corresponding to a modification target event, out of the detection events, is displayed, the waveform display may display a range within which the position of the modification target event can be set. Displaying the range within which the position of the event can be set prevents the user from erroneously modifying the position of the event or adding an event to an erroneous position.

(6) In the data correction apparatus according to one embodiment, described in (5) above,

- the waveform display may be configured to display a cursor to specify the position of the modification target event,
- the input interface may be configured to accept, from the user, an operation to move the cursor and an operation to set the position of the modification target event at the position of the cursor, and
- the correction unit may be configured to modify the position of the modification target event to the position of the cursor. The user can easily perform the modification operation by setting the position of the detection event with the operation of the cursor. As a result, the user's convenience is improved.

(7) An optical time-domain reflectometer according to some embodiments includes the data correction apparatus according to any one of (1) to (6) above.

(8) An optical fiber measurement system according to some embodiments includes:

- the data correction apparatus according to any one of (1) to (6) above; and
- an optical time-domain reflectometer configured to output measurement data to the data correction apparatus.

(9) A data correction method according to some embodiments includes:

- acquiring measurement data from an optical time-domain reflectometer that measures one or more events existing in an optical fiber under test;
- displaying one or more known events whose existence in the optical fiber under test has been known in advance and one or more detection events detected from the measurement data, so that a user can check a difference between the known events and the detection events;
- accepting, from the user, operation input to modify the detection events; and
- modifying the detection events based on the operation input accepted from the user.

(10) A non-transitory computer readable medium according to some embodiments stores a data correction program. The data correction program is configured to cause a processor to execute operations that include:

- acquiring measurement data from an optical time-domain reflectometer that measures one or more events existing in an optical fiber under test;
- displaying one or more known events whose existence in the optical fiber under test has been known in advance and one or more detection events detected from the measurement data, so that a user can check a difference between the known events and the detection events;

accepting, from the user, operation input to modify the detection events; and modifying the detection events based on the operation input accepted from the user.

The data correction apparatus, the optical time-domain reflectometer, the optical fiber measurement system, the data correction method and the non-transitory computer readable medium according to the present disclosure improve the convenience of the modification operation for the measurement data on the events of the optical fiber.

The present disclosure relates to software or an apparatus that corrects measurement data from an optical time-domain reflectometer (OTDR) that measures the distances and events, such as splicing or breaking points, of optical fibers.

When an optical fiber is measured with an optical time-domain reflectometer, the measured distance of the optical fiber may differ according to the wavelength of measurement light. Even when optical fibers of the same length are measured, measured distances may differ due to a difference in a refractive index depending on the wavelength. When a measurement path with many events over a short distance is measured repeatedly multiple times, the distance of each event may shift, which causes difficulty in compilation.

In addition, due to the shape of a waveform detected by the optical time-domain reflectometer, events such as splicing or breaking points of the optical fiber may not be detected properly. For example, an event to be detected may not be detected in the optical fiber, due to a too small change in the waveform at a position at which the event should be detected. Also, an event may be detected at a position at which no event exists, due to noise superimposed on the waveform detected by the optical time-domain reflectometer.

As described above, when the events are not detected properly, a user has to manually modify the detection results of the events. However, a large number of the modification operation for measurement data increases a workload of the user. The user wants to automatically correct the position of each event when the length of the optical fiber or the distances between the splicing points is/are known in advance so that the workload can be reduced.

Therefore, according to the present disclosure, when the user analyzes the length, splicing points, breaking points or the like of the optical fiber from the measurement data from the optical time-domain reflectometer, the measurement data is automatically corrected according to the actual length of the optical fiber, by inputting distance information on the optical fiber in advance. The automatic correction of the measurement data facilitates an analysis operation by the user. Also, when the actual distances between the splicing points of the optical fiber differ from the analysis results of the measurement data, the user can be notified of differing portions. Notifying the user of the differing portions facilitates the user's check operation or modification operation. As a result, the user's workload is reduced.

Embodiments of the present disclosure will be described below, as compared with a comparative example.

Comparative Example

In optical communication systems that perform data communication and the like using optical signals, optical fibers are used as media for transmitting the optical signals. In the installation, disruption relocation, maintenance or the like of the optical fibers, it is necessary to evaluate the lengths of the optical fibers, or the loss, reflection or the like at splicing points. As measurement instruments for evaluation, optical time-domain reflectometers (OTDRs) are used. The optical time-domain reflectometer is an apparatus that has optical pulses incident on an optical fiber under test, measures, in a time domain, the power of backscattered light or light returned by Fresnel reflection to an incident end, and performs display, analysis, or the like.

The backscattered light or the like returns to an incident side with a delay time proportional to a distance from a reflection point. A waveform that has detected the power of the light backscattered or Fresnel-reflected at a fusion point, connector splicing point, bifurcation point, bending point, cutting point, or the like has a characteristic shape. Therefore, based on the waveform that has detected the power of the light, an event such as a fusion point, connector splicing point, bifurcation point, bending point, or cutting point can be detected. A distance from a starting point of the optical fiber under test to the event is also measured. The detection of the event, as described above, may be performed by the optical time-domain reflectometer itself or by a personal computer (PC) application that acquires and analyzes measurement data from the optical time-domain reflectometer.

In a system according to the comparative example, an optical time-domain reflectometer detects events of an optical fiber based on a waveform measured on the optical fiber. The optical time-domain reflectometer displays detected measurement data on a display 90, which includes a waveform display 91 and a measurement data display 92, as illustrated in FIG. 1. The waveform display 91 displays the waveform measured by the optical time-domain reflectometer. In the waveform display 91, the detected events are indicated with markers 93. In other words, the detected events may be schematically displayed with icons such as the markers 93. In the example in FIG. 1, five events and a terminating end of the optical fiber are detected. The measurement data display 92 displays information regarding the detected events as an event list.

In the system according to the comparative example, the detected events are drawn on the waveform as the markers 93, so that the user can determine whether the markers 93 indicating the detected events are placed at correct positions for characteristic points of the waveform. Also, by displaying the detected events in a list format, the user can check splicing points and the like of the optical fiber under test as the list.

A distance from an incident end of the optical fiber under test to each event is calculated based on the time taken for light to return to the incident end of the optical fiber under test. However, the actual length of the optical fiber and the result calculated based on the time taken for the light to return may differ due to a difference in a refractive index of the optical fiber.

When the user knows in advance the length of the optical fiber, or the positions of slicing points or anomalies, the distance from the incident end of the optical fiber under test to each event may be modified to the actual one of the optical fiber. In this case, the user manually edits the distance to each event. However, when there are many events or a large amount of measurement data, an operation may become very complicated. In addition, the time spent on the operation may become excessive. In addition, when the relationship between an algorithm for detecting the events and the shape of the obtained waveform meets certain conditions, an event may not be detected at a position at which the event should exist, or an event may be detected at a position at which the event should not exist.

Figure 2:
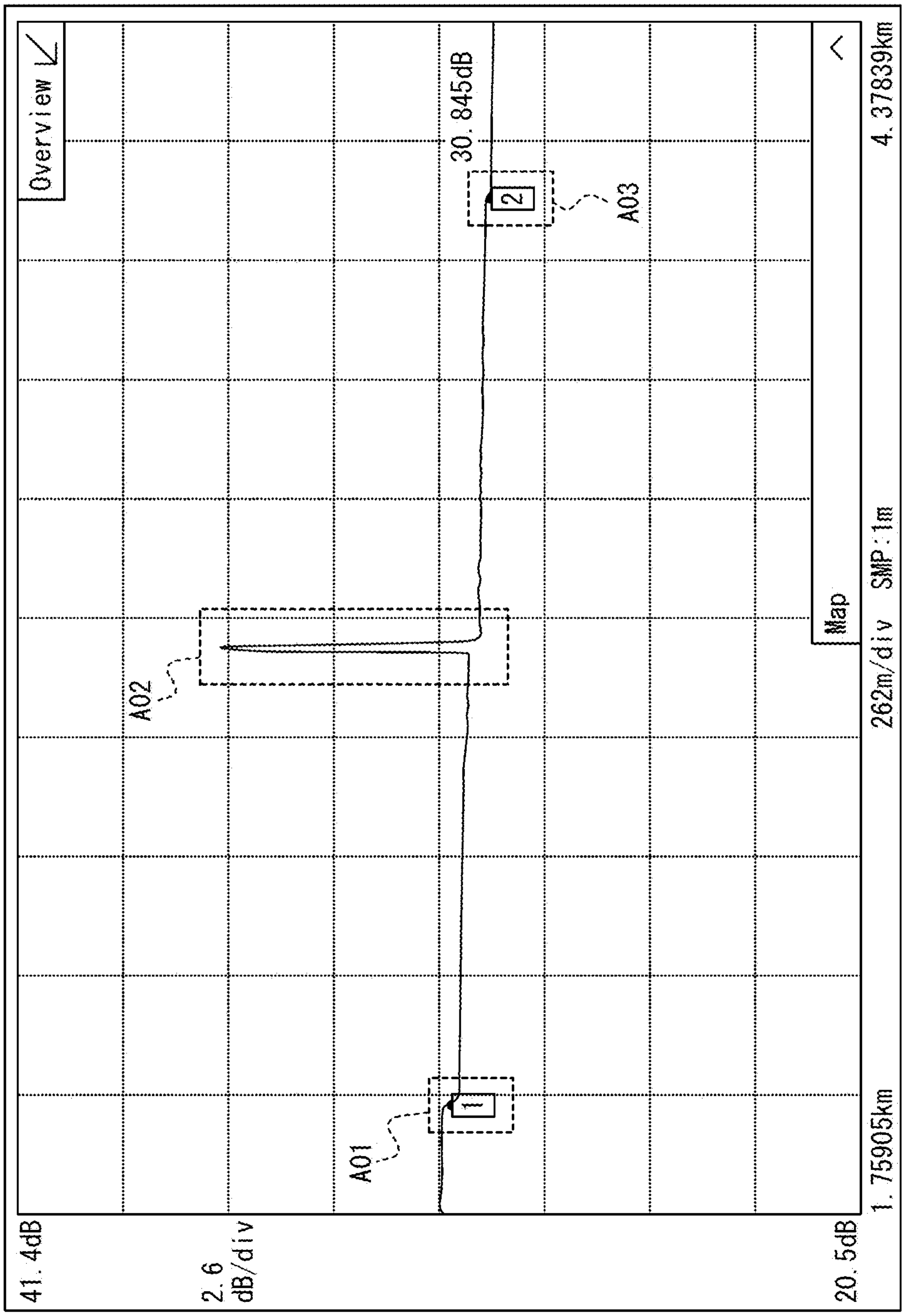
FIG. 2 illustrates an example of a waveform display screen that displays a waveform in which an event has not been automatically detected from the measurement data from the optical time-domain reflectometer.
Figure 3:
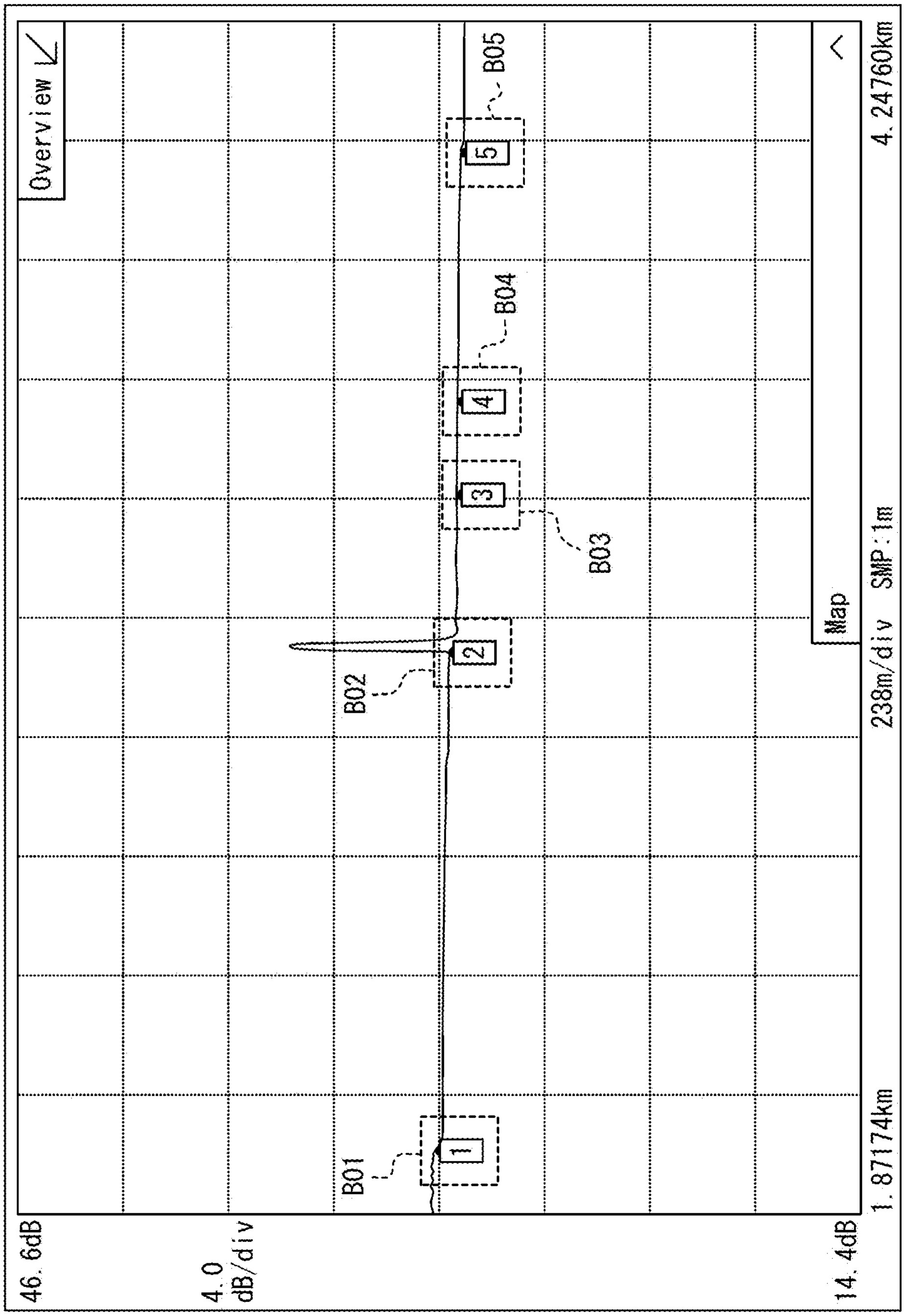
FIG. 3 illustrates an example of the waveform display screen that displays a waveform in which events have been automatically and erroneously detected from the measurement data from the optical time-domain reflectometer.

Based on waveforms illustrated in FIGS. 2 and 3, cases in which events are not detected properly are illustrated. In waveform graphs in FIGS. 2 and 3, the horizontal axis represents distance from the starting point of the optical fiber. The vertical axis represents the magnitude of loss of the light in the optical fiber.

FIG. 2 illustrates an example of a measurement waveform when an event is not detected correctly. Portions enclosed by frames of dashed lines represented by A01, A02, and A03 are points at which events should exist originally. Since the waveform is shaped like steps at the portions enclosed by the frames of the dashed lines represented by A01 and A03, the portions are therefore considered to be points at which optical fibers are fused together. Since the waveform has a largely rising shape at the portion enclosed by the frame of the dashed line represented by A02, the portion is considered to be a point at which optical fibers are spliced to each other by a connector. The fact that the shape of the waveform indicates the existence of the event can be easily understood by the user by visual inspection. However, the apparatus may fail to detect the event when analyzing the waveform. In fact, the portion enclosed by the frame of the dashed line represented by A02 in FIG. 2 is not indicated with a marker corresponding to the event. In other words, the portion enclosed by the frame of the dashed line represented by A02 in FIG. 2 is not detected as an event, even though the event originally exists. When any marker corresponding to the event is not attached, the detection of the event is considered to have failed. When the detection of the event has failed, the user needs to manually set the event to the waveform at the portion represented by A02.

FIG. 3 illustrates an example of a measurement waveform when non-existing events are detected. Since the waveform has steps at portions enclosed by frames of dashed lines represented by B01 and B05, the portions are therefore considered to be points at which optical fibers are fused together. Since the waveform has a rising shape at a portion enclosed by a frame of a dashed line represented by B02, the portion is considered to be a point at which optical fibers are spliced to each other by a connector. On the other hand, since the waveform remains linear in shape and has no characteristic change at portions enclosed by frames of dashed lines represented by B03 and B04, the portions are considered to be neither fusion points nor splicing points. However, the portions are indicated with markers corresponding to events. In other words, the portions enclosed by the frames of the dashed lines represented by B03 and B04 are determined to be erroneously detected as events. When the events are erroneously detected, the user needs to manually delete the detection events for the waveform at the portions represented by B03 and B04.

Here, the user needs to check the waveform of the optical fiber from the start point to the terminating end or a detection event list in order to check whether the events of the optical fiber are properly detected. When the user finds that the events of the optical fiber are not properly detected, the user also needs to manually modify the detection results of the events. As the number of optical fiber measurement data increases, the burden of a check operation and a modification operation for the detection results of the events increases. It is required to improve the user's convenience so that the user's workload can be reduced.

In this disclosure, an optical fiber measurement system and a data correction apparatus 100 (see FIG. 4) that can improve the user's convenience will be described below. The present disclosure aims at improving the convenience of an event detection function by providing an event distance correction function and an event distance editing function that is easily understood by the user through a user interface (UI). In the present disclosure, when information, such as the length of the optical fiber under test or the positions of the splicing points, is known, inputting the distance information for each event into software in advance allows automatic correction of distance in event analysis. In addition, when the detection results of the events differ from the data input in advance, providing a graphical user interface (GUI) with an event modification function and a user guide function shortens the time required for the modification operation for the positions of the events.

Example of Configuration of Optical Fiber Measurement System

Figure 4:
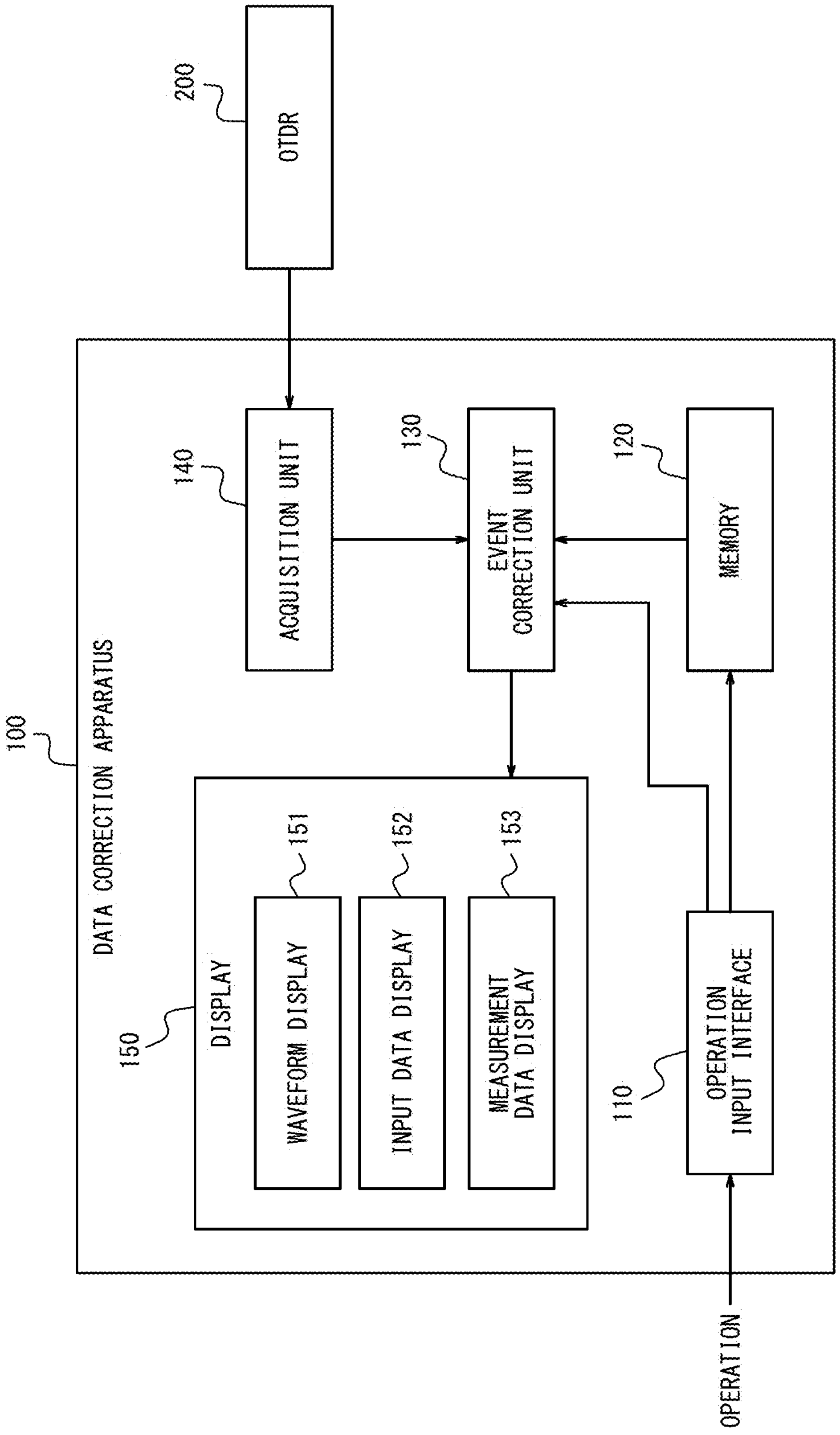
FIG. 4 is a block diagram illustrating an example of a configuration of an optical fiber measurement system according to an embodiment of the present disclosure.

As illustrated in FIG. 4, an optical fiber measurement system according to an embodiment of the present disclosure is provided with a data correction apparatus 100 and an optical time-domain reflectometer (OTDR) 200.

<Data Correction Apparatus 100>

The data correction apparatus 100 is provided with a display 150, an operation input interface 110, a memory 120, an event correction unit 130, and an acquisition unit 140.

The display 150 may include various types of displays, such as a liquid crystal display, for example. The display 150 may be configured as a touch panel display that displays a GUI, which functions as the operation input interface 110, and accepts input from a user. In other words, the display 150 may be integrally configured with the operation input interface 110.

Figure 5:
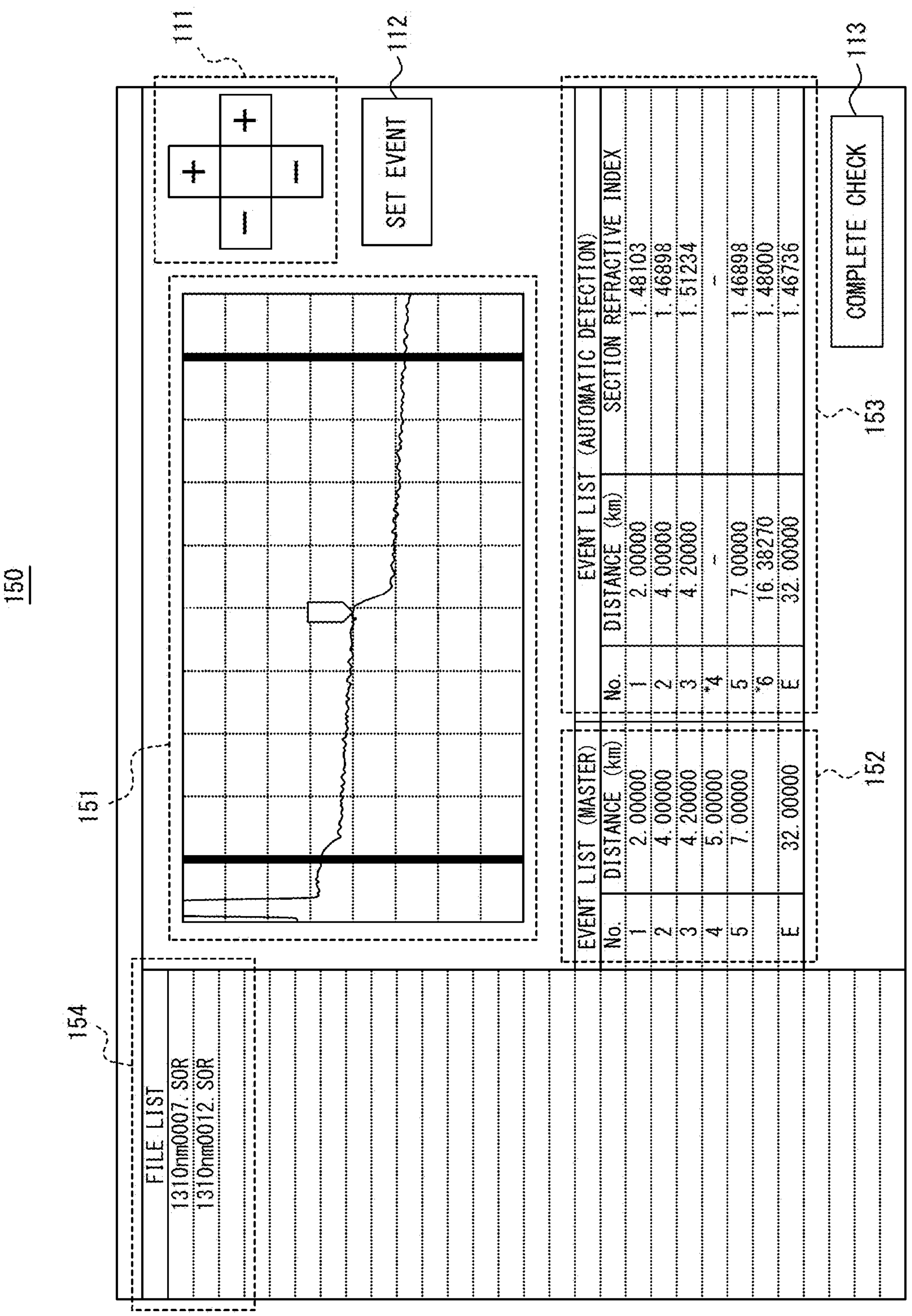
FIG. 5 illustrates an example of a screen displayed on a display.

As illustrated in FIG. 5, the display 150 displays a file list 154, a waveform display 151, an input data display 152, and a measurement data display 153. The contents of information displayed on the display 150 at each part are described below. The display 150 may display a cross key 111, an event setting button 112, and a check completion button 113, as the GUI of the operation input interface 110.

The operation input interface 110 may include an input device that accepts input from the user. The input device may include, for example, a keyboard or physical key, a touch panel or touch sensor, or a pointing device such as a mouse. As described above, the operation input interface 110 may be configured as the touch panel display integrated with the display 150. The operation input interface 110 is also referred to simply as an input interface.

In this embodiment, the display 150 is assumed to be integrally configured with the operation input interface 110. The display 150 displays, as the GUI of the operation input interface 110, the cross key 111, the event setting button 112, and the check completion button 113. The display 150 detects touch input by the user and accepts operation input for the GUI.

The memory 120 stores various information used in operations of the data correction apparatus 100, programs to realize the functions of the data correction apparatus 100, or the like. The memory 120 may function as a work memory for a processor included in the data correction apparatus 100. The memory 120 may be constituted of, for example, a semiconductor memory or the like. The memory 120 may include a volatile memory or a nonvolatile memory. At least part of the memory 120 may be configured as a memory device that is connected external to the data correction apparatus 100.

The acquisition unit 140 acquires measurement data from the optical time-domain reflectometer 200. The acquisition unit 140 may be provided with a communication device for wired or wireless communication with other devices such as the optical time-domain reflectometer 200. The communication device may be provided with a communication interface, such as a local area network (LAN) or RS-232C or RS-485, for example. Not limited to these, the communication device may be provided with a variety of other communication interfaces.

The event correction unit 130 corrects the measurement data acquired by the acquisition unit 140. The event correction unit 130 may automatically correct the measurement data, or may correct the measurement data based on the user's operation acquired from the operation input interface 110. The event correction unit 130 may be constituted of a processor, such as a central processing unit (CPU), for example. The event correction unit 130 may realize a predetermined function by causing the processor to execute a predetermined program. The event correction unit 130 may be constituted of a dedicated circuit, such as a field programmable gate array (FPGA), for example. The event correction unit 130 is also referred to simply as a correction unit.

The data correction apparatus 100 may be further provided with a controller that controls each component. The controller may be constituted of a processor, such as a CPU. The controller may be integrally configured with the event correction unit 130.

The data correction apparatus 100 may be realized as a computer, such as a desktop personal computer (PC) or notebook PC. The data correction apparatus 100 may be realized as a portable terminal such as a smartphone or tablet.

<Optical Time-Domain Reflectometer 200>

The optical time-domain reflectometer 200 has optical pulses incident on an optical fiber under test, and measures, in a time domain, the power of backscattered light or light returned by Fresnel reflection to an incident end. The backscattered light and the like return to the incident end with a delay time according to a distance from a scattering or reflection point and a refractive index of the optical fiber under test in a path through which the light passes. The optical time-domain reflectometer 200 outputs the measurement data in which the power of the light returned to the incident end and the delay time are in correspondence with each other.

The measurement data is represented as a waveform that has detected the power of the light. The waveform that has detected the power of the light backscattered or Fresnel-reflected at a fusion point, connector splicing point, bifurcation point, bending point, cutting point, or the like has a characteristic shape. Therefore, by analyzing the characteristic shape included in the waveform that has detected the power of the light, an event such as a fusion point, connector splicing point, bifurcation point, bending point, or cutting point can be detected. A distance from a starting point of the optical fiber under test to the event is also measured based on the delay time corresponding to the characteristic shape included in the waveform. In the present disclosure, the detection of the event or the measurement of the distance to the event, as described above, may be performed by the data correction apparatus 100 that has acquired the measurement data from the optical time-domain reflectometer 200.

The detection of the event or the measurement of the distance to the event, as described above, may be performed in the optical time-domain reflectometer 200 itself. In this case, the data correction apparatus 100 may be configured as part of the optical time-domain reflectometer 200. In other words, the optical time-domain reflectometer 200 may include the data correction apparatus 100.

Example of Operations of Data Correction Apparatus 100

The data correction apparatus 100 acquires, at the acquisition unit 140, the measurement data on the optical fiber under test from the optical time-domain reflectometer 200. The data correction apparatus 100 detects events of the optical fiber under test from the measurement data. The events of the optical fiber under test detected from the measurement data are also referred to as detection events. The detection results of the events based on the measurement data include information identifying the types and positions of the detection events. The position of each event is expressed as a distance from the incident end of the optical fiber under test.

On the other hand, the data correction apparatus 100 acquires path information on the optical fiber under test. The path information on the optical fiber under test includes information identifying the types and positions of events whose existence has been known in advance in the optical fiber under test. The path information on the optical fiber under test is data that has been input by the user in advance, and is also referred to as input data. In other words, the input data is the path information on the optical fiber under test that has been input by the user in advance. The events whose existence is known in advance in the optical fiber under test are also referred to as known events. The input data includes information identifying the known events. The input data may be data that has been input by the user who operates the data correction apparatus 100 or by another user. The input data is assumed to be stored in advance in the memory 120. The input data may be stored in an apparatus external to the data correction apparatus 100.

The data correction apparatus 100 corrects the positions of the detection events based on the positions of the known events identified by the input data. For example, the data correction apparatus 100 corrects the positions of the detection events to match the positions of the known events corresponding to those detection events.

The data correction apparatus 100 may not be able to correct the positions of at least one of the detection events based on the input data. For example, there may be a case in which a known event corresponding to a detection event does not exist. In this case, the data correction apparatus 100 cannot simply correct the position of the detection event to match the position of a known event identified by the input data.

There may be also a case in which an event corresponding to a known event has not been detected from the measurement data. In this case, the data correction apparatus 100 cannot correct the position of the undetected detection event. The data correction apparatus 100 also cannot automatically add an event that has not been detected automatically as a detection event.

Thus, when there is a difference between the detection events and the known events, the data correction apparatus 100 cannot automatically correct the detection events.

The data correction apparatus 100 lets the user check a detection event that has not been able to be automatically corrected and, if necessary, lets the user modify the detection event. The detection event that has not been able to be corrected by the data correction apparatus 100 is also referred to as a modification target event. When the modification target event exists, the data correction apparatus 100 displays, on the display 150, the waveform of the measurement data at a portion corresponding to the modification target event. The user sees the waveform of the measurement data displayed on the display 150, and upon determining that the modification target event needs to be actually modified, the user inputs a modification operation to the operation input interface 110. The data correction apparatus 100 corrects the modification target event in response to the modification operation accepted at the operation input interface 110. When the user determines that the modification target event does not need to be modified, the data correction apparatus 100 finalizes the modification target event as it is without modification.

An example of specific operations of the data correction apparatus 100 is described below. The data correction apparatus 100 may execute a data correction method that includes procedures in flowcharts illustrated in FIGS. 6 and 7. The data correction method may be realized as a data correction program to be executed by the processor constituting the data correction apparatus 100. The data correction program may be stored in a non-transitory computer readable medium.

<Automatic Detection and Automatic Correction of Measurement Data>

Figure 6:
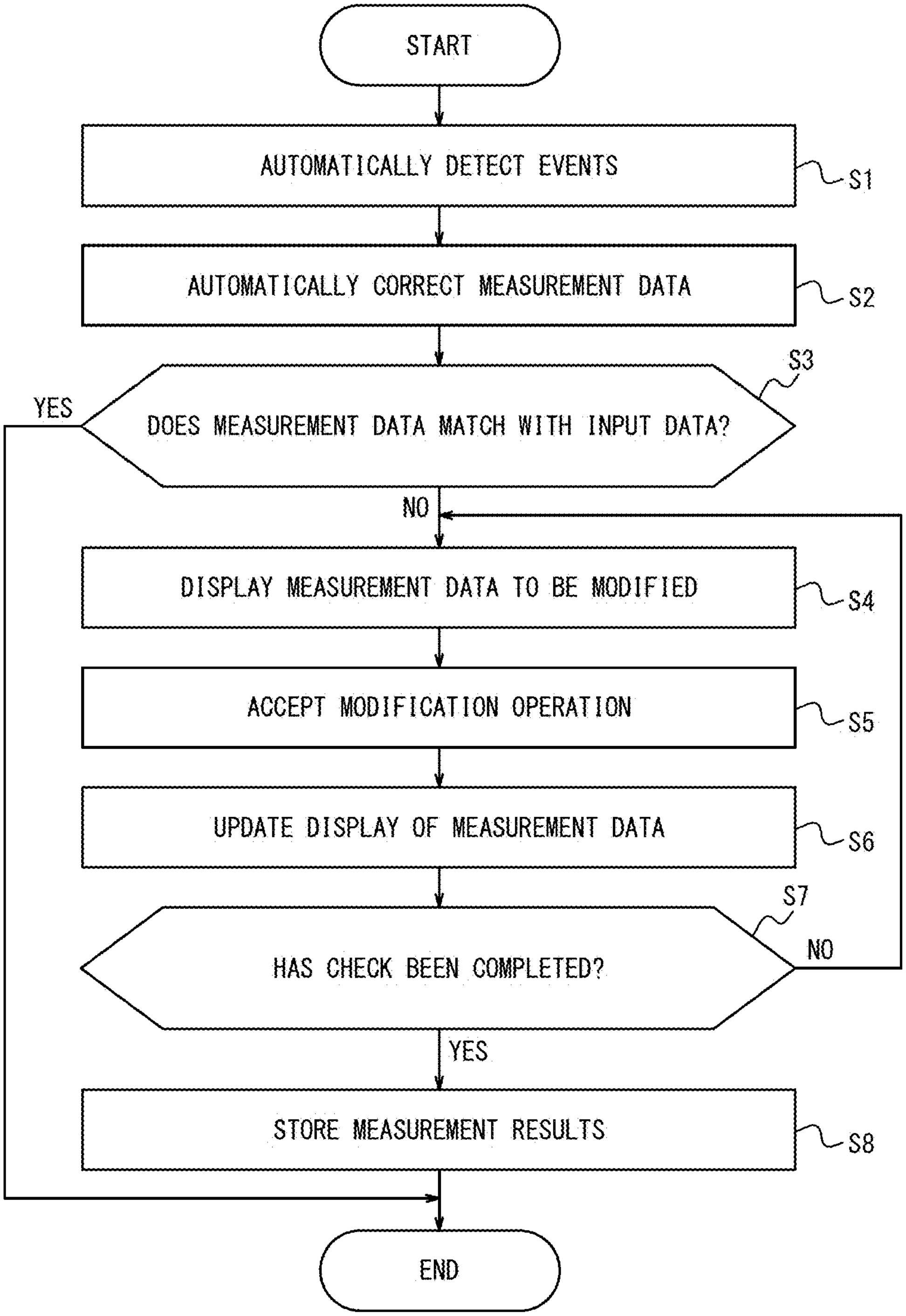
FIG. 6 is a flowchart illustrating an example of a procedure for a data correction method according to an embodiment of the present disclosure.

With reference to the flowchart in FIG. 6, the event correction unit 130 of the data correction apparatus 100 acquires measurement data on an optical fiber under test from the optical time-domain reflectometer 200 via the acquisition unit 140, and detects a characteristic shape included in a waveform of the measurement data as an event (step S1). The event correction unit 130 calculates a distance from an incident end to the event, which represents the position of the event, based on a group refractive index (index of reference: IOR) of the optical fiber under test set in the data correction apparatus 100 and a light delay time.

Here, due to a difference between the group refractive index of the optical fiber under test set in the data correction apparatus 100 and an actual group refractive index of the optical fiber under test, an error may occur between the detected position of the event and the actual position of the event in the optical fiber under test. The event correction unit 130 automatically corrects the measurement data (step S2). In other words, the event correction unit 130 automatically corrects the position of the detection event detected from the measurement data.

When the event correction unit 130 has detected multiple events from the measurement data, the event correction unit 130 executes automatic correction for the multiple detection events in turn. Before executing the automatic correction, the event correction unit 130 acquires input data, which is path information on the optical fiber under test measured by the optical time-domain reflectometer 200, from the memory 120 or an external apparatus. As described above, the input data, which is the path information on the optical fiber under test, includes information identifying the positions of known events. The input data may further include information identifying the types of the known events.

Figure 8:
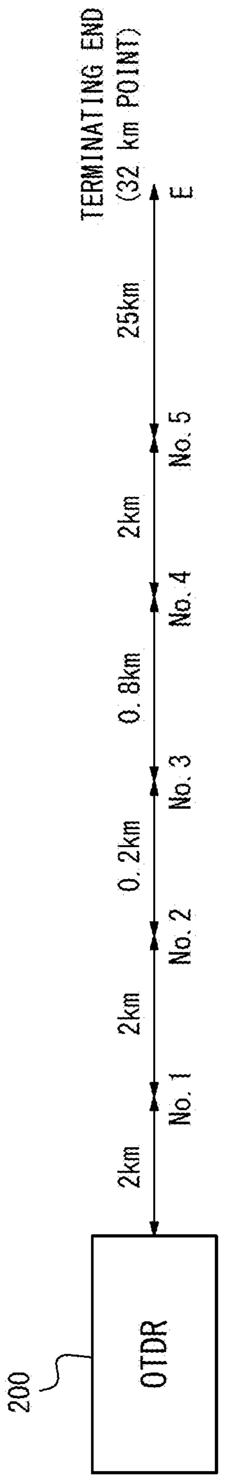
FIG. 8 is a diagram illustrating an example of a configuration of an optical fiber under test.

Here, as illustrated in FIG. 8, assume that the optical fiber under test according to this embodiment is an optical fiber with five events from No. 1 to No. 5 between the incident end connected to the optical time-domain reflectometer (OTDR) 200 and a terminating end (E). The optical fiber under test includes six different optical fibers. The six optical fibers are spliced at the five events.

Figure 10:
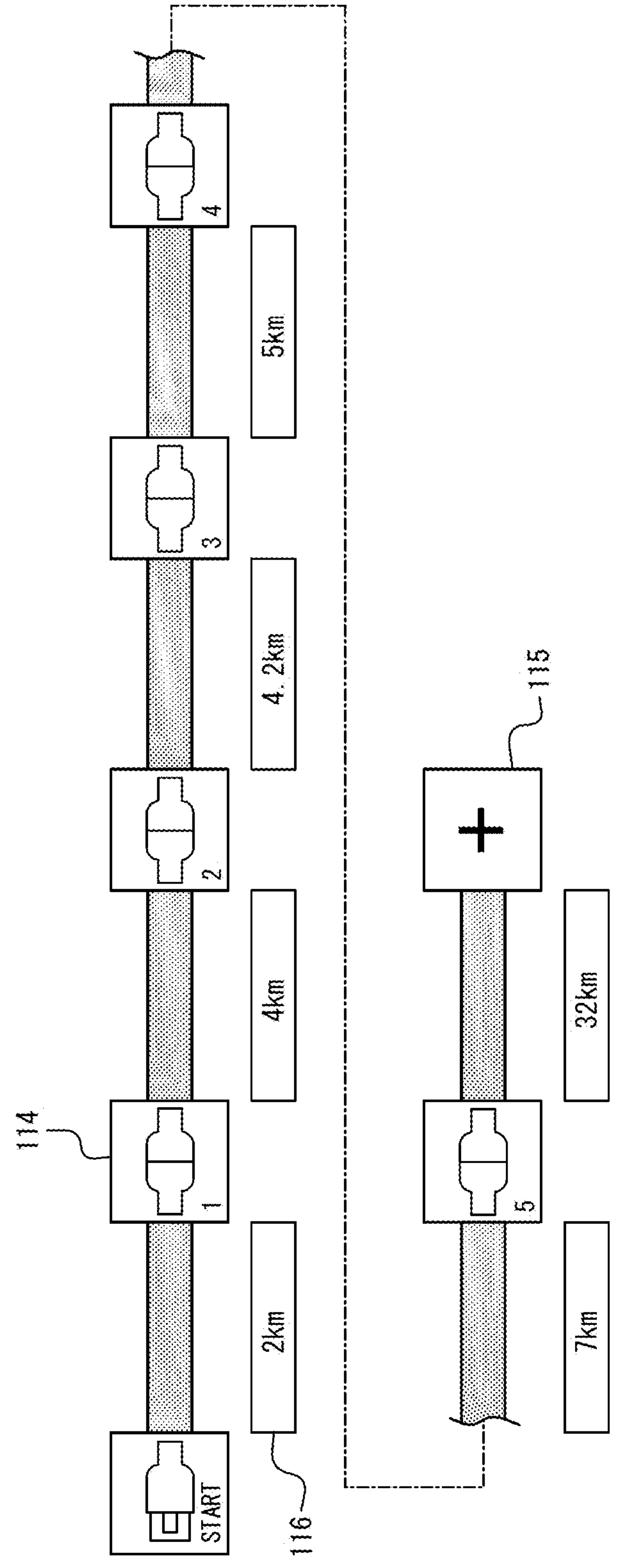
FIG. 10 illustrates an example of a screen to input the events of the optical fiber under test using icons that represent optical fibers and a splicing point.

The input data identifying the position of each of the five events that exist in the optical fiber under test in FIG. 8 may be input using a table-format input interface as illustrated in FIG. 9. The input data may be input using a GUI as illustrated in FIG. 10. The GUI illustrated in FIG. 10 includes icons 114, which represent events such as splicing points included in the path of the optical fiber under test, an icon 115, which adds an event at the terminating end of the optical fiber under test, and input frames 116, into each of which a distance to each event is input. Each icon 114 may be configured to change the type of the event. The icon 115 may be configured to allow specifying the type of the event to be added. The GUI is not limited to the example described above, and may be realized in other aspects.

The data correction apparatus 100 may accept input of the input data at the data correction apparatus 100. The data correction apparatus 100 may acquire the input data that has been input at an external apparatus.

Figure 7:
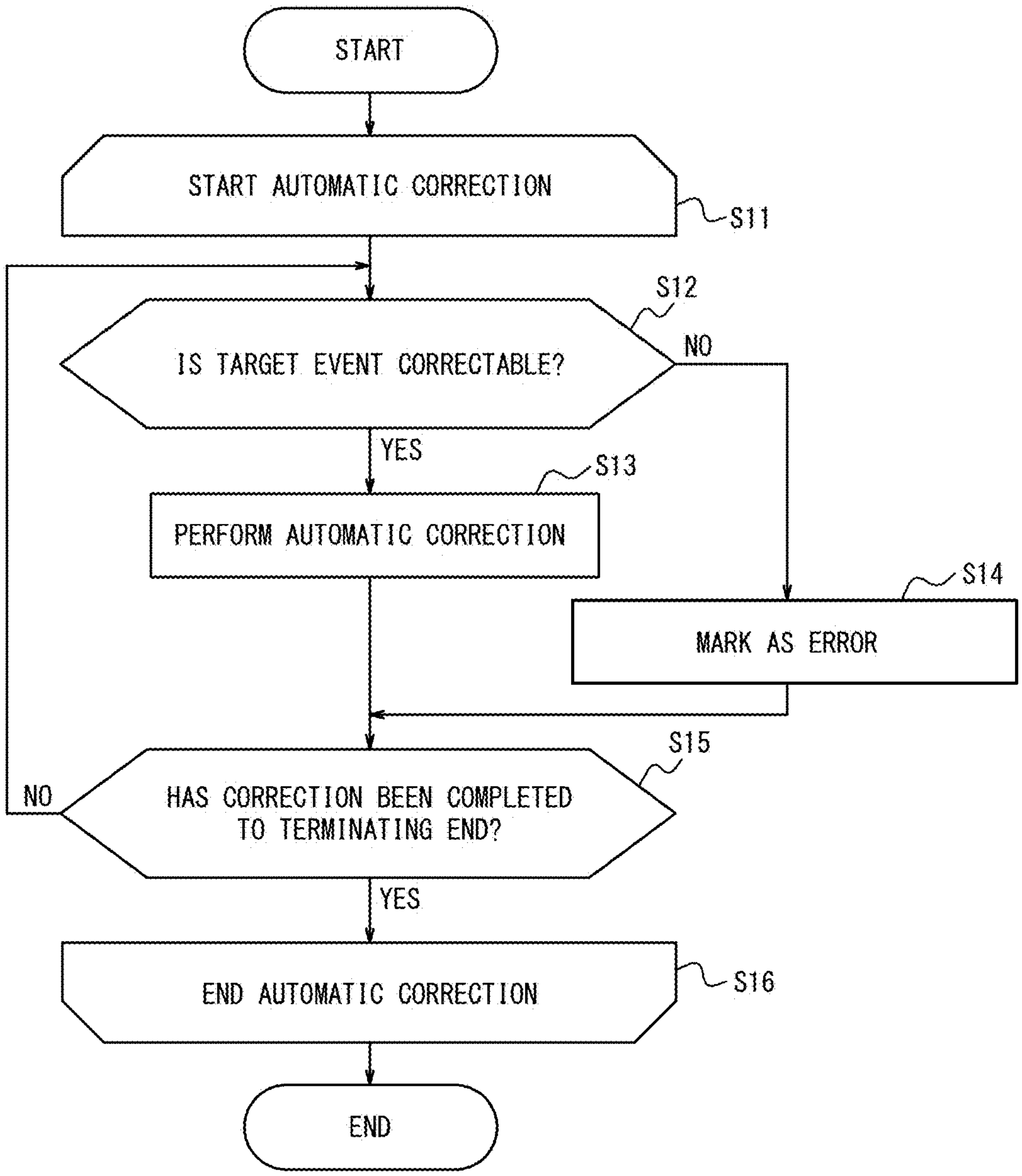
FIG. 7 is a flowchart illustrating an example of a procedure for automatic correction of measurement data.

The event correction unit 130 performs the automatic correction of the measurement data as the procedure in the flowchart in FIG. 7. The event correction unit 130 starts the automatic correction of the measurement data (step S11). In other words, the event correction unit 130 starts the automatic correction of the position of the detection event detected from the measurement data. When the multiple events are detected from the measurement data, the event correction unit 130 selects one of the multiple detection events sequentially from the incident end of the optical fiber under test, as a target event for the automatic correction, and determines whether the target event is correctable (step S12). The event correction unit 130 determines that the target event is correctable when the target event is in correspondence with a known event identified by the input data.

When the target event is correctable (step S12: YES), the event correction unit 130 performs the automatic correction for the target event (step S13). Specifically, the event correction unit 130 corrects the position of the target event to match the position of the known event identified by the input data. In other words, the event correction unit 130 corrects the position of the target event as per the input data. After performing the process of step S13, the event correction unit 130 proceeds to step S15.

When the target event is not correctable (step S12: NO), the event correction unit 130 marks the target event as an error (step S14). After performing the process of step S14, the event correction unit 130 proceeds to step S15.

The event correction unit 130 determines whether the correction of the target events has been completed to the terminating end of the optical fiber under test (step S15). In other words, the event correction unit 130 determines whether the correction is possible for all of the detection events detected from the measurement data on the optical fiber under test, and determines whether the automatic correction of events that are correctable has been completed.

When the correction has not been completed to the terminating end of the optical fiber under test (step S15: NO), the event correction unit 130 selects the next event as a target event for the automatic correction, and performs the processes of step S12 and later. When the correction has been completed to the terminating end of the optical fiber under test (step S15: YES), the event correction unit 130 ends the automatic correction of the measurement data (step S16).

The event correction unit 130 saves a file of the automatically corrected measurement data at the end of the automatic correction of the measurement data. The event correction unit 130 may save the automatically corrected measurement data by storing the automatically corrected measurement data in the memory 120 or an external apparatus.

When at least one of the events is not correctable, the event correction unit 130 may store an identifier indicating the presence of an error, in association with the measurement data including the event that is not correctable, so that the measurement data including the event that is not correctable can be distinguished.

There is a case in which an event corresponding to a known event identified by the input data is not detected from the measurement data. In other words, there is a case in which at least one of the known events is not detected from the measurement data. In this case, the event correction unit 130 may store an identifier indicating the presence of an error, in association with the measurement data in which the undetected event exists, so that the measurement data in which the undetected event exists can be distinguished.

When the measurement data has been corrected as per the input data and when all of the known events identified by the input data have been detected from the measurement data, the event correction unit 130 may store an identifier indicating the absence of an error, in association with the measurement data.

The event correction unit 130 may save the file of the automatically corrected measurement data, together with the input data used to perform the automatic correction of that measurement data. The input data used to perform the automatic correction of the measurement data is also referred to as corresponding input data to the measurement data.

As an example of the automatic correction, assume that the automatic correction is performed to match the positions of detection events illustrated as a table in FIG. 11 with the positions of known events identified by input data in FIG. 9. The detection events of Nos. 1, 2 and 3 before the automatic correction in FIG. 11 correspond to the known events of Nos. 1, 2 and 3 in FIG. 9. The detection event of No. 4 before the automatic correction in FIG. 11 corresponds to the known event of No. 5 in FIG. 9. The event correction unit 130 corrects the positions of the detection events of No. 1, 2, 3 and 4 before the automatic correction in FIG. 11 to match the positions of the known events of No. 1, 2, 3 and 5 in FIG. 9.

On the other hand, the detection event of No. 5 in FIG. 11 does not correspond to any of the known events in the input data of FIG. 9. In other words, the input data in FIG. 9 does not include any known event corresponding to the detection event of No. 5 in FIG. 11. The event correction unit 130 determines that the automatic correction cannot be performed for the detection event of No. 5 before the automatic correction in FIG. 11, and marks the detection event of No. 5 as an error. When saving the measurement data including the detection events after the automatic correction, the event correction unit 130 may associate an identifier indicating the presence of an error, as the measurement data including the detection event that is not correctable.

The detection events in FIG. 11 do not include any event corresponding to the known event of No. 4 in the input data of FIG. 9. When saving the measurement data after the automatic correction, the event correction unit 130 may associate an identifier indicating the presence of an error, as the measurement data in which the undetected event exists.

After execution of the process in step S16, the event correction unit 130 returns to the flowchart in FIG. 6 to finish execution of the automatic correction process in step S2, and proceeds to step S3.

<Manual Correction of Measurement Data>

The event correction unit 130 determines whether the input data and the measurement data match with each other (step S3). Specifically, the event correction unit 130 determines that the input data and the measurement data match with each other when all of the detection events detected from the automatically corrected measurement data are common to all of the known events included in the corresponding input data. Conversely, the event correction unit 130 determines that the input data and the measurement data do not match with each other when there is an event that is included in the detection events but is not included in the known events. The event correction unit 130 also determines that the input data and the measurement data do not match with each other when there is an event that is not included in the detection events but is included in the known events. When the event correction unit 130 determines that the input data and the measurement data match with each other (step S3: YES), the data correction apparatus 100 ends the execution of the procedure in the flowchart in FIG. 6. In other words, the data correction apparatus 100 completes the correction of the measurement data.

When the event correction unit 130 determines that the input data and the measurement data do not match with each other (step S3: NO), the data correction apparatus 100 displays, on the display 150, the measurement data to be modified (step S4). The measurement data to be modified is the measurement data that does not match with the input data. The measurement data to be modified is the measurement data including the modification target event.

The data correction apparatus 100 accepts, at the operation input interface 110, input from the user to select a file of the measurement data to be modified, and displays the selected measurement data and the corresponding input data on the display 150.

Figure 12:
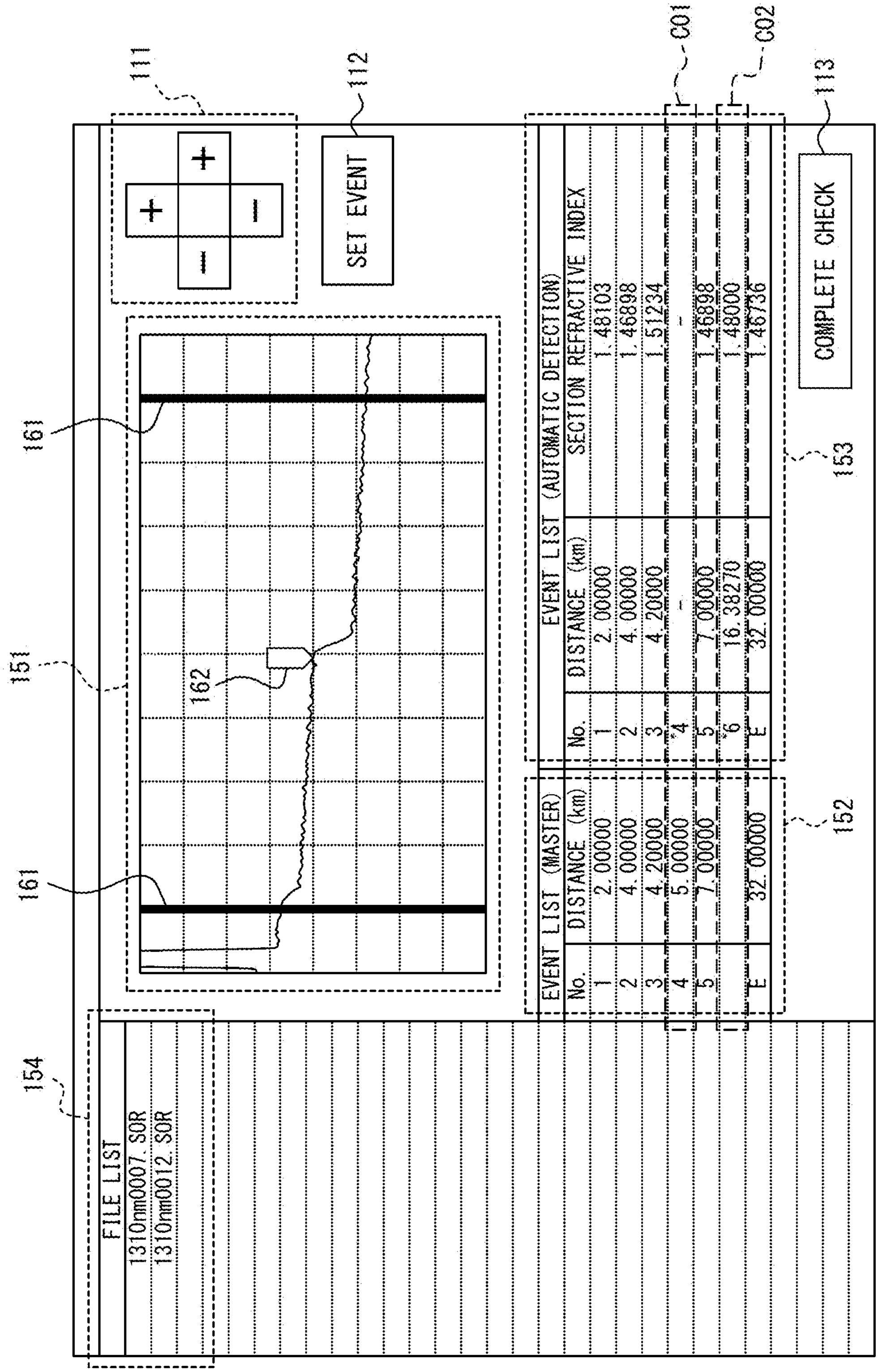
FIG. 12 illustrates an example of a screen to modify the measurement data.

As illustrated in FIG. 12, the data correction apparatus 100 may display the selected measurement data and the corresponding input data on the display 150. The display 150 displays, on a screen, the file of the measurement data, a waveform of the measurement data, the input data, or the detection results of the events based on the measurement data. In other words, the screen displayed on the display 150 includes the file list 154, the waveform display 151, the input data display 152, and the measurement data display 153. The screen displayed on the display 150 further includes the cross key 111, the event setting button 112, and the check completion button 113, which are the GUI of the operation input interface 110.

The file list 154 displays files of the automatically corrected measurement data in a list format. The file list 154 may indicate whether the measurement data in a file has an error, in a format such as OK or NG, in association with its file name. The measurement data with an error is the measurement data to be modified, including the modification target event. By displaying whether the measurement data has an error, the user can easily find the file of the measurement data to be modified that includes the modification target event. As a result, the user's convenience is improved.

The waveform display 151 displays the waveform of the measurement data. The vertical axis of a graph, which represents the waveform of the measurement data, represents the power of the light that has returned to the incident end by being scattered at a scattering point or reflected at a reflection point in the optical fiber under test. The horizontal axis represents distance from the incident end to the scattering or reflection point of the light in the optical fiber under test.

The input data display 152 displays the positions of the known events identified by the input data. The position of each known event is expressed as a distance from the incident end to the known event in the optical fiber under test. Assume that the known events of the optical fiber under test are five events from No. 1 to No. 5 in FIG. 9. An event displayed as No. E means the terminating end of the optical fiber under test.

The measurement data display 153 displays information regarding the detection events detected from the measurement data. The measurement data display 153 displays, as the information regarding the detection events, the positions and section refractive indices of the detection events in the display example in FIG. 12. The position of each detection event is expressed as a distance from the incident end to the detection event in the optical fiber under test. The section refractive index is a group refractive index of a section that includes each event after the correction in the optical fiber under test.

The data correction apparatus 100 displays the selected measurement data and the corresponding input data on the display 150 so that the detection events correspond to the known events.

The input data display 152 and the measurement data display 153 may display, horizontally side-by-side, events that are included in common in the detection events of the measurement data and the known events of the corresponding input data. In the display example in FIG. 12, the events that are included in common in the detection events of the measurement data and the known events of the corresponding input data are displayed, as four events of Nos. 1, 2, 3 and 5, in the input data display 152 and the measurement data display 153. The four known events of Nos. 1, 2, 3 and 5 displayed in the input data display 152 correspond to the four known events of Nos. 1, 2, 3 and 4 in FIG. 9, respectively. The four detection events of Nos. 1, 2, 3 and 5 displayed in the measurement data display 153 correspond to the four detection events of Nos. 1, 2, 3 and 4 in FIG. 11, respectively.

When there is an undetected event, out of the known events identified by the input data, that has not been detected from the measurement data, the measurement data display 153 displays a row corresponding to the undetected event as blank space. The input data display 152 displays the known event corresponding to the undetected event alongside the blank space in the measurement data display 153. In the display example in FIG. 12, as indicated by a rectangle of a dashed line illustrated as C01, a row of No. 4 in the measurement data display 153 is blank space. The blank space in the measurement data display 153 indicates that the known event of No. 4 in the input data display 152 is an event undetected from the measurement data. In other words, the blank space in the measurement data display 153 indicates that there is an undetected event in the measurement data.

When there is an erroneously detection event, out of the detection events detected from the measurement data, that is not included in the known events, the input data display 152 displays a row corresponding to the erroneously detection event as blank space. The measurement data display 153 displays the erroneously detection event alongside the blank space in the input data display 152. In the display example in FIG. 12, as indicated by a rectangle of a dashed line illustrated as C02, the detection event of No. 6 is displayed in the measurement data display 153. In contrast, a row for an event of No. 6 is blank space in the input data display 152. The blank space in the input data display 152 indicates that an event that is not included in the known events has been erroneously detected from the measurement data. In other words, the blank space in the input data display 152 indicates that there is an erroneously detection event in the measurement data.

As described above, the display 150 displays the known events and the detection events so that the user can see the difference between the known events and the detection events. This allows the user to easily recognize the modification target event. As a result, the user's convenience is improved.

The display 150 may display, as the difference, an event, out of the detection events, that is not included in the known events, and an event, out of the known events, that is not included in the detection events. This allows the user to recognize the modification target event more easily. As a result, the user's convenience is improved.

The display 150 may include the input data display 152, which displays the known events identified by the input data, and the measurement data display 153, which displays the detection events detected from the measurement data. The input data display 152 may display an event that is not included in the detection events but is included only in the known events, in correspondence with the blank space in the measurement data display 153. The measurement data display 153 may display an event that is not included in the known events but is included only in the detection events, in correspondence with the blank space in the input data display 152. This allows the user to recognize the modification target event more easily. As a result, the user's convenience is improved.

The input data display 152 and the measurement data display 153 may not have to display an event that is included in common in the known events and the detection events. This allows the user to recognize only the modification target event, i.e., an event that is not included in common in the known events and the detection events. As a result, the user's convenience is improved.

The undetected event of No. 4 and the erroneously detection event of No. 6, which are enclosed by the rectangles of the dashed lines illustrated as C01 and C02, correspond to the modification target events. The modification target events may be displayed in a different manner so that the modification target events can be distinguished from the events not to be modified. In the display example in FIG. 12, the numbers in the No. column of the modification target events are marked with asterisks (*). The modification target events may be displayed, for example, with hatching or color on the background of the rows. Not limited to these examples, the modification target events may be displayed in various manners.

Returning to the flowchart in FIG. 6, the data correction apparatus 100 accepts, at the operation input interface 110, a modification operation for the detection events by the user (step S5). In other words, the data correction apparatus 100 accepts, at the operation input interface 110, operation input by the user to modify the detection events. Specifically, the data correction apparatus 100 accepts, at the operation input interface 110, input by the user to select a modification target event, from among the events displayed in the input data display 152 and the measurement data display 153. The data correction apparatus 100 displays, on the waveform display 151, the waveform of the measurement data at a portion corresponding to the selected modification target event.

In the display example in FIG. 12, the waveform display 151 displays a cursor 162 to specify the position of the event after the modification, along with the waveform of the measurement data at the portion corresponding to the modification target event. Setting the position of a detection event includes modifying the position of the detection event and adding the detection event. The operation input interface 110 accepts operation input to move the cursor 162 with the cross key 111 and to set the position of the detection event to the position of the cursor 162 with the event setting button 112. Since the position of the detection event can be set by operating the cursor 162, the user can easily perform the modification operation. As a result, the user's convenience is improved.

The waveform display 151 may further display vertical lines of an event setting range 161, which represents a range within which the position of the detection event can be set. Displaying the event setting range 161 prevents the user from erroneously modifying the position of the event or adding the event to an erroneous position.

When the modification target event is an undetected event, the user determines a position at which the event should be detected, based on a shape characteristic of the waveform. The user specifies the position at which the event is to be added by moving the cursor 162 to the position at which the event should be detected and tapping, clicking, or pressing the event setting button 112. The event correction unit 130 of the data correction apparatus 100 newly adds an event of the measurement data to the position specified by the user. The event correction unit 130 calculates a section refractive index so that the position of the newly added event matches the position of a known event corresponding to that event.

When the modification target event is an erroneously detection event, the user determines whether to delete the modification target event or leave the modification target event as is, based on a shape characteristic of the waveform. For example, when the waveform has an uncharacteristic shape, such as a straight line, at the portion corresponding to the modification target event, the user determines that the modification target event is in fact an erroneously detected event, and inputs an operation to delete the modification target event. In response to the operation to delete the modification target event, the event correction unit 130 deletes the modification target event from the events in the measurement data.

When the waveform has a characteristic shape, such as a step or spike, at the portion corresponding to the modification target event, the user may determine that the modification target event is not an erroneously detected event, but an unexpected event that has not been previously known, for example, a disconnection. In this case, the user does not input the operation to delete the modification target event so that the modification target event remains as is.

Returning to the flowchart in FIG. 6, the data correction apparatus 100 updates the display of the measurement data (step S6). Specifically, the data correction apparatus 100 reflects the display of the newly set modification target event or the deleted modification target event in the input data display 152 and the measurement data display 153.

The data correction apparatus 100 determines whether the user has completed a check of the measurement data (step S7). The data correction apparatus 100 may determine that the check has been completed when the user has tapped, clicked, or pressed the check completion button 113. The data correction apparatus 100 may determine that the check has been completed when the input data and the measurement data have matched with each other due to the modification operation by the user.

When it is determined that the check has not been completed (step S7: NO), the data correction apparatus 100 returns to the process of step S4 to accept the user's modification operation for the next modification target event.

When it is determined that the check has been completed (step S7: YES), the data correction apparatus 100 stores the measurement data for which modification has been completed, as the measurement results of the optical fiber under test (step S8). The data correction apparatus 100 may store the measurement data by storing the measurement results in the memory 120 or an external apparatus. The measurement results of the optical fiber under test may be used in an inspection report of the optical fiber under test or the like. The data correction apparatus 100 ends the execution of the flowchart in FIG. 6 after the execution of the process in step S8. After the execution of the process of step S8, the data correction apparatus 100 may return to the process of step S4 to accept an operation of selecting the next file of the measurement data.

<Conclusion>

As described above, the data correction apparatus 100 according to the present disclosure can automatically detect the events of the optical fiber under test from the measurement data of the optical fiber under test measured by the optical time-domain reflectometer 200. The data correction apparatus 100 can also automatically correct the positions of the detection events detected from the measurement data according to the positions of the known events identified by the input data.

For example, the detection event of No. 1 before the automatic correction in FIG. 11 is analyzed that the distance from the incident end is 2.00139 km and the section refractive index is 1.48. On the other hand, the detection event of No. 1 after the automatic correction, which is displayed in the measurement data display 153 in FIG. 12, is corrected as the distance from the incident end is 2.00000 km and the section refractive index is 1.48103. In other words, the event correction unit 130 can correct the distance from the incident end to the detection event to match the position of the known event identified by the input data, by correcting the section refractive index to be consistent with the distance correction.

Therefore, the data correction apparatus 100 according to the present disclosure can resolve the problem that the length of an optical fiber calculated from measurement data may differ from the actual length of the optical fiber due to a difference in a refractive index of the optical fiber.

The data correction apparatus 100 according to the present disclosure also displays the difference between the detection events detected from the measurement data of the optical fiber under test and the known events identified by the input data. By checking the difference, the user does not have to check all of the detection events, but may check only the modification target event corresponding to the difference. The user can check only the modification target event, and thus easily or efficiently perform the modification operation for the detection events detected from the measurement data. As a result, the user's convenience is improved.

OTHER EMBODIMENTS

Other embodiments of the optical fiber measurement system and the data correction apparatus 100 will be described.

<Aspect of Data Correction Apparatus 100>

In the embodiment described above, the data correction apparatus 100 is configured as a separate apparatus from the optical time-domain reflectometer 200. The functions of the data correction apparatus 100 may be realized as the functions of part of the optical time-domain reflectometer 200. That is, the functions of the data correction apparatus 100 may be realized by firmware in a main body of the optical time-domain reflectometer 200. When the functions of the data correction apparatus 100 are realized as the functions of part of the optical time-domain reflectometer 200, the input data that identifies the events whose existence in the optical fiber under test has been known in advance may be input to the optical time-domain reflectometer 200, in the stage of preparing the measurement of the optical fiber under test with the optical time-domain reflectometer 200. Inputting the input data to the optical time-domain reflectometer 200 in advance can eliminate man-hours required for editing the events at a site of measurement work of the optical fiber under test, man-hours required for modifying the measurement data when events to be checked or inspected are not detected automatically, or the like.

<Display Aspect of Difference Between Measurement Data and Input Data>

As described above, the input data display 152 and the measurement data display 153 of the display 150 display the detection events detected from the measurement data and the known events identified by the corresponding input data in correspondence with each other. The input data display 152 and the measurement data display 153 may be displayed side-by-side horizontally or vertically to display the detection events and the known events in correspondence with each other. The input data display 152 and the measurement data display 153 may display the detection events and the known events in other manners, not limited to the horizontal or vertical side-by-side arrangement, as long as the user can recognize the correspondence between the detection events and the known events.

Although the embodiments according to the present disclosure have been described based on the drawings and examples, it should be noted that one skilled in the art can make various variations or modifications based on the present disclosure. Accordingly, it should be noted that these variations or modifications are included in the scope of the present disclosure. For example, the functions or the like included in each component can be rearranged so as not to be logically inconsistent, and multiple components can be combined into one or divided.

The invention claimed is:

1. A data correction apparatus comprising:

a communication device configured to acquire measurement data from an optical time-domain reflectometer that measures one or more events existing in an optical fiber under test;

a memory configured to store path information on the optical fiber under test, the path information including information identifying types of one or more known events existing in the optical fiber under test;

a display configured to display the one or more known events stored in the memory and one or more detection events detected from the measurement data, so that a user can check a difference between the known events and the detection events, wherein the display is configured to display:

(i) an event included in the detection events but not included in the known events, and (ii) an event included in the known events but not included in the detection events, as the difference, wherein the event included in the detection events but not included in the known events and the event included in the known events but not included in the detection events are modification target events;

an input interface configured to accept, from the user, operation input to modify the modification target events; and a correction unit configured to modify the modification target events based on the operation input accepted from the user.

2. The data correction apparatus according to claim 1, wherein the display comprises an input data display configured to display the known events, and a measurement data display configured to display the detection events, the input data display is configured to display an event that is not included in the detection events but is included only in the known events, in correspondence with blank space in the measurement data display, and the measurement data display is configured to display an event that is not included in the known events but is included only in the detection events, in correspondence with blank space in the input data display.

3. The data correction apparatus according to claim 2, wherein the input data display and the measurement data display do not display an event that is included in common in the known events and the detection events.

4. The data correction apparatus according to claim 1, wherein the display comprises a waveform display configured to display a waveform of the measurement data, and when a portion of the waveform corresponding to a modification target event, out of the detection events, is displayed, the waveform display displays a range within which a position of the modification target event can be set.

5. The data correction apparatus according to claim 4, wherein the waveform display is configured to display a cursor to specify the position of the modification target event, the input interface is configured to accept, from the user, an operation to move the cursor and an operation to set the position of the modification target event at a position of the cursor, and the correction unit is configured to modify the position of the modification target event to the position of the cursor.

6. An optical time-domain reflectometer comprising the data correction apparatus according to claim 1.

7. An optical fiber measurement system comprising:

the data correction apparatus according to claim 1; and an optical time-domain reflectometer configured to output measurement data to the data correction apparatus.

8. A data correction method comprising:

acquiring measurement data from an optical time-domain reflectometer that measures one or more events existing in an optical fiber under test;

storing, in a memory, path information on the optical fiber under test, the path information including information identifying types of one or more known events existing in the optical fiber under test;

displaying the one or more known events stored in the memory and one or more detection events detected from the measurement data, so that a user can check a difference between the known events and the detection events, wherein the displaying further comprising displaying:

(i) an event included in the detection events but not included in the known events, and (ii) an event included in the known events but not included in the detection events, as the difference, wherein the event included in the detection events but not included in the known events and the event included in the known events but not included in the detection events are modification target events;

accepting, from the user, operation input to modify the modification target events; and modifying the modification target events based on the operation input accepted from the user.

9. A non-transitory computer readable medium storing a data correction program configured to cause a processor to execute operations, the operations comprising:

acquiring measurement data from an optical time-domain reflectometer that measures one or more events existing in an optical fiber under test;

storing, in a memory, path information on the optical fiber under test, the path information including information identifying types of one or more known events existing in the optical fiber under test;

displaying the one or more known events stored in the memory and one or more detection events detected from the measurement data, so that a user can check a difference between the known events and the detection events, wherein the displaying further comprising displaying:

(i) an event included in the detection events but not included in the known events, and (ii) an event included in the known events but not included in the detection events, as the difference, wherein the event included in the detection events but not included in the known events and the event included in the known events but not included in the detection events are modification target events;

accepting, from the user, operation input to modify the modification target events; and modifying the modification target events based on the operation input accepted from the user.

10. The data correction apparatus according to claim 1, wherein the one or more known events is identified by an input data input by a user.

11. The data correction method according to claim 8, wherein the one or more known events is identified by an input data input by a user.

12. The non-transitory computer readable medium according to claim 10, wherein the one or more known events is identified by an input data input by a user.

13. The data correction method according to claim 8, further includes:

displaying, in an input data display configured to display the known events, an event that is not included in the detection events but is included only in the known events, in correspondence with blank space in the measurement data display, and displaying, in a measurement data display configured to display the detection events, an event that is not included in the known events but is included only in the detection events, in correspondence with blank space in the input data display.

14. The data correction method according to claim 8, further includes:

displaying, in a waveform display configured to display a waveform of the measurement data, a range within which a position of the modification target event can be set when a portion of the waveform corresponding to a modification target event, out of the detection events, is displayed;

displaying, in the waveform display, a cursor to specify the position of the modification target event;

accepting, from the user, an operation to move the cursor and an operation to set the position of the modification target event at a position of the cursor; and modifying the position of the modification target event to the position of the cursor.

15. The non-transitory computer readable medium according to claim 9, wherein the operations comprise:

displaying, in an input data display configured to display the known events, an event that is not included in the detection events but is included only in the known events, in correspondence with blank space in the measurement data display, and displaying, in a measurement data display configured to display the detection events, an event that is not included in the known events but is included only in the detection events, in correspondence with blank space in the input data display.

16. The non-transitory computer readable medium according to claim 9, wherein the operations comprise:

displaying, in a waveform display configured to display a waveform of the measurement data, a range within which a position of the modification target event can be set when a portion of the waveform corresponding to a modification target event, out of the detection events, is displayed;

displaying, in the waveform display, a cursor to specify the position of the modification target event;

accepting, from the user, an operation to move the cursor and an operation to set the position of the modification target event at a position of the cursor; and modifying the position of the modification target event to the position of the cursor.

* * * * *